(12) United States Patent
Xue et al.

(10) Patent No.: US 12,299,193 B2
(45) Date of Patent: May 13, 2025

(54) GAZE DEMARCATING SYSTEM, METHOD, DEVICE AND NON-TRANSITORY COMPUTER READABLE STORAGE MEDIUM

(71) Applicant: Beijing Shiyan Technology Co., Ltd., Beijing (CN)

(72) Inventors: Yachong Xue, Beijing (CN); Xue Dong, Beijing (CN); Zhongyuan Wu, Beijing (CN); Jiankang Sun, Beijing (CN); Guixin Yan, Beijing (CN); Guang Bai, Beijing (CN); Jiyang Shao, Beijing (CN)

(73) Assignee: BEIJING SHIYAN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/029,672

(22) PCT Filed: May 27, 2022

(86) PCT No.: PCT/CN2022/095755
§ 371 (c)(1),
(2) Date: Mar. 31, 2023

(87) PCT Pub. No.: WO2023/226034
PCT Pub. Date: Nov. 30, 2023

(65) Prior Publication Data
US 2024/0361830 A1    Oct. 31, 2024

(51) Int. Cl.
*G06F 3/01* (2006.01)
*G06T 7/73* (2017.01)

(52) U.S. Cl.
CPC .............. *G06F 3/013* (2013.01); *G06F 3/017* (2013.01); *G06T 7/73* (2017.01);
(Continued)

(58) Field of Classification Search
CPC ....... G06T 7/70–85; G06T 2207/10024; G06T 2207/10048; G06T 2207/30041;
(Continued)

(56) References Cited

U.S. PATENT DOCUMENTS

2013/0083003 A1*  4/2013  Perez .................. G06F 3/013
                                                    345/419
2013/0145304 A1*  6/2013  DeLuca .............. G06F 3/013
                                                    715/781
(Continued)

FOREIGN PATENT DOCUMENTS

CN          206209591 U      5/2017
CN          107172417 A      9/2017
(Continued)

*Primary Examiner* — Nathan Danielsen
(74) *Attorney, Agent, or Firm* — Ling Wu; Stephen Yang; Ling and Yang Intellectual Property

(57) ABSTRACT

A gaze demarcating system, a method, a device, and a non-transitory computer-readable storage medium are provided. The gaze demarcating system includes: an eye movement tracking apparatus, configured to acquire pupil position coordinates; a gesture recognition apparatus, configured to acquire gesture position coordinates; a display interaction apparatus, configured to interact with a gesture; a gaze behavior determining apparatus, configured to, in a process of the display interaction apparatus interacting with the gesture, acquire a plurality of groups of effective gaze coordinates and a plurality of groups of effective gaze pupil position coordinates corresponding to the plurality of groups of effective gaze coordinates according to the gesture position coordinates and the pupil position coordinates that are acquired, the plurality of groups of effective gaze coordinates correspond to different interaction positions in a display region.

18 Claims, 7 Drawing Sheets

(52) U.S. Cl.
CPC .............. *G06T 2207/10024* (2013.01); *G06T 2207/10048* (2013.01); *G06T 2207/30201* (2013.01)

(58) Field of Classification Search
CPC ... G06T 2207/30201; G06F 3/011–013; G06F 3/017; G06F 3/0425; G06F 3/0426
See application file for complete search history.

(56) References Cited

U.S. PATENT DOCUMENTS

| | | | |
|---|---|---|---|
| 2015/0205437 A1* | 7/2015 | Takahashi | G06F 3/013 345/178 |
| 2016/0139665 A1 | 5/2016 | Lopez et al. | |
| 2020/0077072 A1* | 3/2020 | Hsu | G06T 7/75 |
| 2021/0089123 A1* | 3/2021 | Sun | G06F 3/017 |
| 2022/0309702 A1 | 9/2022 | Deng | |

FOREIGN PATENT DOCUMENTS

| | | | |
|---|---|---|---|
| CN | 110705504 A | 1/2020 | |
| CN | 110706283 A | 1/2020 | |
| CN | 113420678 A | 9/2021 | |
| WO | WO-2019050543 A1 * | 3/2019 | ............. A61B 3/113 |

* cited by examiner

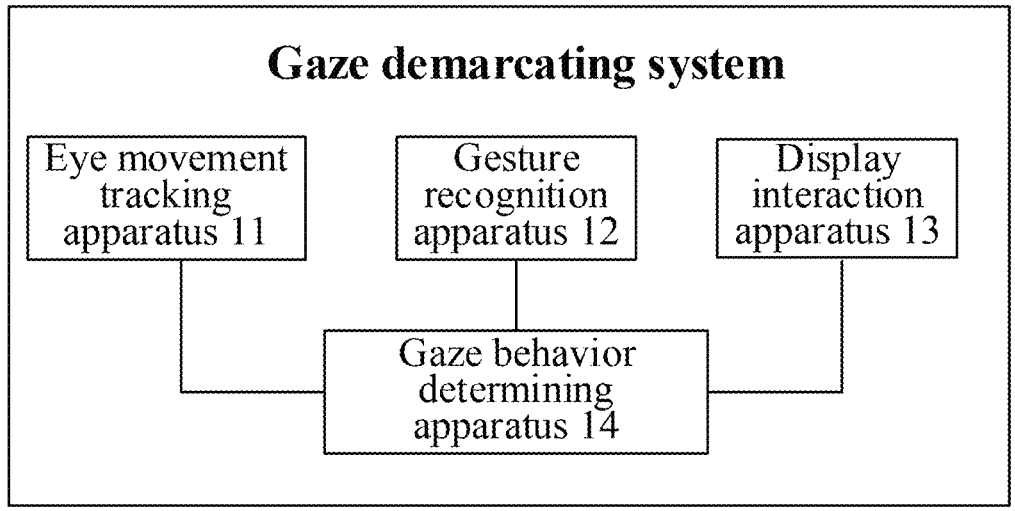

FIG. 1

```
┌─────────────────────────────────────────────────────────────┐
│ An eye movement tracking apparatus acquires pupil position  │
│ coordinates in real time, and a gesture recognition         │── S1
│ apparatus acquires gesture position coordinates             │
└─────────────────────────────────────────────────────────────┘
                              │
                              ▼
┌─────────────────────────────────────────────────────────────┐
│ A gaze behavior determining apparatus obtains a plurality   │
│ of groups of effective gaze coordinates and a plurality of  │
│ groups of effective gaze pupil position coordinates         │
│ corresponding to the plurality of groups of effective gaze  │
│ coordinates according to the gesture position coordinates   │── S2
│ and the pupil position coordinates that are acquired in     │
│ real time in a process of a gesture interacting with a      │
│ display region, wherein the plurality of groups of          │
│ effective gaze coordinates correspond to different          │
│ interaction positions in the display region                 │
└─────────────────────────────────────────────────────────────┘
                              │
                              ▼
┌─────────────────────────────────────────────────────────────┐
│ The gaze behavior determining apparatus calculates,         │
│ according to the plurality of groups of effective gaze      │
│ coordinates and the corresponding plurality of groups of    │── S3
│ effective gaze pupil position coordinates, a gaze mapping   │
│ model to complete gaze demarcating                          │
└─────────────────────────────────────────────────────────────┘
```

FIG. 2

GAZE DEMARCATING SYSTEM, METHOD, DEVICE AND NON-TRANSITORY COMPUTER READABLE STORAGE MEDIUM

CROSS-REFERENCE TO RELATED APPLICATION

The present application is a U.S. National Phase Entry of International Application No. PCT/CN2022/095755 having an international filing date of May 27, 2022. The above-identified application is hereby incorporated by reference.

TECHNICAL FIELD

Embodiments of the present disclosure relate to, but are not limited to, the technical field of gaze tracking, in particular to a gaze demarcating system, a method, a device, and a non-transitory computer readable storage medium.

BACKGROUND

A gaze tracking technology is a technology that estimates a gaze direction or a gaze pausing point position by using a movement situation of eyes. With wide popularity of computers, the gaze tracking technology has been paid more and more attention, and has been widely applied in human-computer interaction, medical diagnosis, psychology, military, and other fields.

SUMMARY

The following is a summary of subject matters described herein in detail. The summary is not intended to limit the protection scope of claims.

In a first aspect, an embodiment of the present disclosure provides a gaze demarcating system, which includes: an eye movement tracking apparatus, a gesture recognition apparatus, a display interaction apparatus, and a gaze behavior determining apparatus; the eye movement tracking apparatus is configured to acquire pupil position coordinates; the gesture recognition apparatus is configured to acquire gesture position coordinates; the display interaction apparatus is configured to interact with a gesture; and the gaze behavior determining apparatus is respectively connected with the eye movement tracking apparatus, the gesture recognition apparatus, and the display interaction apparatus, and is configured to, in a process in which the display interaction apparatus interacts with the gesture, obtain a plurality of groups of effective gaze coordinates and a plurality of groups of effective gaze pupil position coordinates corresponding to the plurality of groups of effective gaze coordinates according to the gesture position coordinates and the pupil position coordinates that are acquired, wherein the plurality of groups of effective gaze coordinates correspond to different interaction positions in a display region; and according to the plurality of groups of effective gaze coordinates and the corresponding plurality of groups of effective gaze pupil position coordinates, calculate a gaze mapping model to complete gaze demarcating.

In an exemplary implementation, the eye movement tracking apparatus is configured to: acquire a pupil image, calculate pupil position coordinates according to the pupil image, add a time stamp to any one of the pupil position coordinates, establish a corresponding relationship between the pupil position coordinates and the time stamp, and store pupil position coordinates in shortest effective gaze time of a preset multiple before a current time node and a corresponding time stamp; wherein, the shortest effective gaze time is a time experience value of gazing an interaction position before the gesture falls to the interaction position; and the gesture recognition apparatus is configured to calculate the gesture position coordinates according to the gesture image.

In an exemplary implementation, the gaze behavior determining apparatus is configured to: detect whether the gesture interacts with the display region, and record gesture position coordinates at current time when detecting a state in which the gesture interacts with the display region; determine whether the gesture position coordinates at the current time are located in an interaction region of the display region, and in a state in which it is determined that the gesture position coordinates at the current time are located in the interaction region of the display region, acquire a group of the effective gaze coordinates according to the gesture position coordinates at the current time, and acquire corresponding effective gaze pupil position coordinates according to the acquired pupil position coordinates; and determine whether a quantity of effective gaze coordinates and a quantity of corresponding effective gaze pupil position coordinates reach a preset group quantity, and in a state in which the quantity of the effective gaze coordinates and the quantity of the corresponding effective gaze pupil position coordinates reach the preset group quantity, calculate the gaze mapping model according to the plurality of groups of effective gaze coordinates and the corresponding plurality of groups of effective gaze pupil position coordinates; and in a state in which the quantity of the effective gaze coordinates and the quantity of the corresponding effective gaze pupil position coordinates do not reach the preset group quantity, continue to detect whether the gesture interacts with the display region.

In an exemplary implementation, the gaze behavior determining apparatus is configured to: according to the corresponding relationship between the pupil position coordinates and the time stamp, and the stored time stamp, acquire a plurality of pupil position coordinates in latest saved shortest effective gaze time before the current time; sort the plurality of pupil position coordinates, delete largest n values and smallest n values, and average remaining pupil position coordinates to obtain effective gaze pupil position coordinates corresponding to effective gaze coordinates at the current time, wherein the n is a positive integer greater than or equal to 1 and less than a quantity of pupil position coordinates.

In an exemplary implementation, the gaze behavior determining apparatus is configured to: acquire a plurality of gesture position coordinates in shortest effective interaction time after the current time, sort the plurality of gesture position coordinates, delete largest n values and smallest n values, and average remaining gesture position coordinates to obtain the effective gaze coordinates at the current time, wherein the n is a positive integer greater than or equal to 1 and less than a quantity of gesture position coordinates.

In an exemplary implementation, the gaze behavior determining apparatus is configured to: acquire a boundary coordinates data set of the display region, and when the gesture position coordinates are located within a range of the boundary coordinates data set of the display region, determine that the gesture interacts with the display region.

In an exemplary implementation, the gaze behavior determining apparatus is configured to: acquire a boundary coordinates data set of a display interaction region, and when the gesture position coordinates are located within a range of the boundary coordinates data set of the display interaction region, determine that the gesture position coordinates are located in the interaction region with the display region.

In an exemplary implementation, the eye movement tracking apparatus is further configured to acquire gaze point coordinates; the gesture recognition apparatus is further configured to acquire gesture pausing point coordinates; the display interaction apparatus is further configured to send data of the current display interaction region to the gaze behavior determining apparatus; and the gaze behavior determining apparatus is further configured to acquire data of the display interaction region, determine whether it is in an effective gaze state according to the gaze point coordinates and the data of the display interaction region that are acquired, determine whether it is in an effective interaction state according to the gesture pausing point coordinates and the data of the display interaction region that are acquired, and when determining that it is in the effective gaze state and in the effective interaction state, calculate an average value of a plurality of gaze point coordinates in effective gaze time, and calculate an average value of a plurality of gesture pausing points in effective interaction time; calibrate the gaze point coordinates according to the data of the display interaction region and the average value of the plurality of gaze point coordinates; and compensate the gesture pausing point coordinates according to the average value of the plurality of gesture pausing points.

In an exemplary implementation, the gaze behavior determining apparatus is configured to: calculate center coordinates of data of the current display interaction region by taking data of the display interaction region closest to the average value of the plurality of gaze point coordinates and the average value of the plurality of gesture pausing point coordinates as the data of the current display interaction region; calculate a difference between the average value of the plurality of gaze points coordinates and the center coordinates to obtain a first difference; calculate a difference between the average value of the plurality of gestures pausing point coordinates and the center coordinate to obtain a second difference; compensate the gaze point coordinates according to the first difference, and compensate the gesture pausing point coordinates according to the second difference.

In an exemplary implementation, the gaze behavior determining apparatus is further configured to calibrate the gaze mapping model according to the first difference and the second difference.

In an exemplary implementation, the gaze behavior determining apparatus is configured to: when a plurality of gaze point coordinates within preset time are each located near the data of the display interaction region or within a range of the data of the display interaction region, determine that the gaze point coordinates are in an effective gaze state.

In an exemplary implementation, the gaze behavior determining apparatus is configured to: when a plurality of gesture pausing point coordinates within preset time are located near the data of the display interaction region or within a range of the data of the display interaction region, determine that the gesture pausing point coordinates are in an effective interaction state.

In an exemplary implementation, the eye movement tracking apparatus includes an eye movement tracking hardware module and an eye movement tracking algorithm module, wherein the eye movement tracking hardware module includes a first camera, a second camera, and a first processor; the first camera is configured to collect a human face image; the second camera is configured to collect a pupil image; the first processor is connected with the first camera and the second camera, and is configured to acquire the human face image and the pupil image, and send the human face image and the pupil image to the eye movement tracking algorithm module; the eye movement tracking algorithm module is electrically connected with the eye movement tracking hardware module, and is configured to locate human eye coordinates according to the human face image through a human face algorithm, and acquire pupil position coordinates according to the pupil image by adopting the following formula for the human eye coordinates:

$$u_B = \frac{f_{xB}(u_A - U_A)}{f_{xA}} + U_B + \frac{f_{xB} * s}{z};$$

and $$v_B = \frac{f_{yB}(v_A - V_A)}{f_{yA}} + V_B + \frac{f_{xB} * t}{z};$$

wherein, $f_{xA}$, $f_{yA}$, $U_A$, $V_A$ indicates an internal parameter matrix of the first camera, $f_{xB}$, $f_{yB}$, $U_B$, $V_B$ indicates an external parameter matrix of the second camera, z indicates a distance value from current eyes to the first camera, s indicates an abscissa difference between original points of the first camera and the second camera, t indicates an ordinate difference between the original points of the first camera and the second camera, $u_B$ indicates an abscissa value of pupil position coordinates, and $v_B$ indicates an ordinate value of the pupil position coordinates.

In an exemplary implementation, the gesture recognition apparatus includes a gesture recognition hardware module and a gesture recognition algorithm module, wherein the gesture recognition hardware module includes a third camera, a fourth camera, and a second processor; the third camera is configured to acquire a distance from the gesture to the fourth camera; the fourth camera is configured to collect a gesture image; the second processor is connected with the third camera and the fourth camera, and is configured to acquire the gesture image and the distance from the gesture to the fourth camera, and send the gesture image and the distance from the gesture to the fourth camera to the gesture recognition algorithm module; the eye movement tracking algorithm module is electrically connected with the gesture recognition hardware module, and is configured to acquire coordinates of the gesture in the fourth camera according to the gesture image, and perform the following operation on the coordinates of the gesture in the fourth camera and the distance from the gesture to the fourth camera to acquire gesture position coordinates:

$$X = \frac{(u - u') * d}{fx};$$

$$Y = \frac{(v - v') * d}{fy};$$

fx, fy, u', v' indicates an internal parameter matrix of the fourth camera, u, v indicates coordinates of the gesture in an image of the fourth camera, and d indicates the distance from the gesture to the fourth camera.

In an exemplary implementation, the eye movement tracking hardware module further includes a first fill light, and the first processor is further configured to detect an intensity of external light rays, and turn on the first fill light when the intensity of the external light rays is less than a threshold intensity and the first camera and/or the second camera are in a collection state.

In an exemplary implementation, the gesture recognition hardware module further includes a second fill light, and the second processor is further configured to detect an intensity of external light rays, and turn on the second fill light when the intensity of the external light rays is less than a threshold intensity and the third camera and/or the fourth camera are in a collection state.

In an exemplary implementation, a wavelength of light rays emitted by the first fill light is different from a wavelength of light rays emitted by the second fill light.

In an exemplary implementation, the first camera is an RGB camera, the second camera and the fourth camera are IR cameras, and the third camera is a depth camera.

In a second aspect, an embodiment of the present disclosure further provides a gaze demarcating method, which is applied to the gaze demarcating system of any of the above embodiments, wherein the gaze demarcating method includes: acquiring, by an eye movement tracking apparatus, pupil position coordinates, and acquiring, by a gesture recognition apparatus, gesture position coordinates; obtaining, by a gaze behavior determining apparatus, a plurality of groups of effective gaze coordinates and a plurality of groups of effective gaze pupil position coordinates corresponding to the plurality of groups of effective gaze coordinates according to the gesture position coordinates and the pupil position coordinates that are acquired in a process in which a gesture interacts with a display region, wherein the plurality of groups of effective gaze coordinates correspond to different interaction positions in the display region; calculating, by the gaze behavior determining apparatus according to the plurality of groups of effective gaze coordinates and the corresponding a plurality of groups of effective gaze pupil position coordinates, a gaze mapping model to complete gaze demarcating.

In an exemplary implementation, acquiring, by the eye movement tracking apparatus, pupil position coordinates includes: acquiring, by the eye movement tracking apparatus, a pupil image, calculating the pupil position coordinates according to the pupil image, adding a time stamp to any one of the pupil position coordinates, establishing a corresponding relationship between the pupil position coordinates and the time stamp, and storing pupil position coordinates in shortest effective gaze time of a preset multiple before a current time node and a corresponding time stamp; wherein, the shortest effective gaze time is a time experience value of fixating an interaction position before the gesture falls to the interaction position; and acquiring, by the gesture recognition apparatus, gesture position coordinates includes: acquiring, by the gesture recognition apparatus, a gesture image, and calculating the gesture position coordinates according to the gesture image.

In an exemplary implementation, obtaining, by the gaze behavior determining apparatus, a plurality of groups of effective gaze coordinates and a plurality of groups of effective gaze pupil position coordinates corresponding to the plurality of groups of effective gaze coordinates according to the gesture position coordinates and the pupil position coordinates that are acquired includes: detecting whether the gesture interacts with the display region, and recording gesture position coordinates at current time when detecting a state in which the gesture interacts with the display region; determining whether the gesture position coordinates at the current time are located in an interaction region of the display region, and in a state in which it is determined that the gesture position coordinates at the current time are located in the interaction region of the display region, acquiring a group of the effective gaze coordinates according to the gesture position coordinates at the current time, and acquiring corresponding effective gaze pupil position coordinates according to the acquired pupil position coordinates; and determining whether a quantity of effective gaze coordinates and a quantity of corresponding effective gaze pupil position coordinates reach a preset group quantity, and in a state in which the quantity of the effective gaze coordinates and the quantity of the corresponding effective gaze pupil position coordinates reach the preset group quantity, calculating a gaze mapping model according to the plurality of groups of effective gaze coordinates and the corresponding plurality of groups of effective gaze pupil position coordinates; and in a state in which the quantity of the effective gaze coordinates and the quantity of the corresponding effective gaze pupil position coordinates do not reach the preset group quantity, continuing to detect whether the gesture interacts with the display region.

In an exemplary implementation, acquiring corresponding effective gaze pupil position coordinates according to the acquired pupil position coordinates includes: according to the corresponding relationship between the pupil position coordinates and the time stamp, and the stored time stamp, acquiring a plurality of pupil position coordinates in latest saved shortest effective gaze time before the current time; sorting the plurality of pupil position coordinates, deleting largest n values and smallest n values, and averaging remaining pupil position coordinates to obtain effective gaze pupil position coordinates corresponding to effective gaze coordinates at the current time, wherein the n is a positive integer greater than or equal to 1 and less than a quantity of pupil position coordinates.

In an exemplary implementation, acquiring a group of the effective gaze coordinates according to the gesture position coordinates at the current time includes: acquiring a plurality of gesture position coordinates in shortest effective interaction time after the current time, sorting the plurality of gesture position coordinates, deleting largest n values and smallest n values, and averaging remaining gesture position coordinates to obtain the effective gaze coordinates at the current time, wherein the n is a positive integer greater than or equal to 1 and less than a quantity of gesture position coordinates.

In an exemplary implementation, detecting whether the gesture interacts with the display region includes: acquiring a boundary coordinate data set of the display region, and when the gesture position coordinates are located within a range of the boundary coordinate data set of the display region, determining that the gesture interacts with the display region.

In an exemplary implementation, determining whether the gesture position coordinates at the current time are located in an interaction region of the display region includes: acquiring a boundary coordinate data set of a display interaction region, and when the gesture position coordinates are located within a range of the boundary coordinate data set of the display interaction region, determining that the gesture position coordinates are located in the interaction region with the display region.

In an exemplary implementation, after completing gaze demarcating, it further includes: acquiring, by the eye movement tracking apparatus, gaze point coordinates, and acquiring, by the gesture recognition apparatus, gesture pausing point coordinates; acquiring, by the gaze behavior determining apparatus, data of the display interaction region, determining whether it is in an effective gaze state according to the gaze point coordinates and the data of the display interaction region that are acquired, determining whether it is in an effective interaction state according to the gesture pausing point coordinates and the data of the display interaction region that are acquired, and when determining that it is in the effective gaze state and in the effective interaction state, calculating an average value of a plurality of gaze point coordinates in effective gaze time, and calculating an average value of a plurality of gesture pausing points in effective interaction time; and compensating, by the gaze behavior determining apparatus, the gaze point coordinates according to the data of the display interaction region and the average value of the plurality of gaze point coordinates; and compensating the gesture pausing point coordinates according to the average value of the plurality of gesture pausing points.

In an exemplary implementation, compensating the gaze point coordinates according to the data of the display interaction region and the average value of the plurality of gaze point coordinates; and compensating the gesture pausing point coordinates according to the average value of the plurality of gesture pausing points includes: calculating center coordinates of data of the current display interaction region by taking data of the display interaction region closest to the average value of the plurality of gaze point coordinates and the average value of the plurality of gesture pausing point coordinates as the data of the current display interaction region; calculating a difference between the average value of the plurality of gaze points coordinates and the center coordinates to obtain a first difference; calculating a difference between the average value of the plurality of gestures pausing point coordinates and the center coordinates to obtain a second difference; compensating the gaze point coordinates according to the first difference, and compensating the gesture pausing point coordinates according to the second difference.

In an exemplary implementation, after obtaining the first difference and the second difference, it further includes: calibrating the gaze mapping model according to the first difference and the second difference.

In an exemplary implementation, determining whether it is in an effective gaze state according to the gaze point coordinates and the data of the display interaction region includes: when a plurality of gaze point coordinates within preset time are each located near the data of the display interaction region or within a range of the data of the display interaction region, determining that the gaze point coordinates are in an effective gaze state.

In an exemplary implementation, determining whether it is in an effective interaction state according to the gesture pausing point coordinates and the data of the display interaction region includes: when a plurality of gesture pausing point coordinates within preset time are each located near the data of the display interaction region or within a range of the data of the display interaction region, determining that the gesture pausing point coordinates are in an effective interaction state.

In an exemplary implementation, the eye movement tracking apparatus includes an eye movement tracking hardware module and an eye movement tracking algorithm module, wherein the eye movement tracking hardware module includes a first camera, a second camera, and a first processor; acquiring, by the eye movement tracking apparatus, pupil position coordinates, includes: collecting, by the first camera, a human face image, and collecting, by the second camera, a pupil image; acquiring, by the first processor, the human face image and the pupil image, and sending the human face image and the pupil image to the eye movement tracking algorithm module; locating, by the eye movement tracking algorithm module, human eye coordinates according to the human face image through a human face algorithm, and performing the following operation on the human eye coordinates according to the pupil image to acquire the pupil position coordinates:

$$u_B = \frac{f_{xB}(u_A - U_A)}{f_{xA}} + U_B + \frac{f_{xB} * s}{z};$$

$$v_B = \frac{f_{yB}(v_A - V_A)}{f_{yA}} + V_B + \frac{f_{xB} * t}{z};$$

wherein, $f_{xA}$, $f_{yA}$, $U_A$, $V_A$ indicates an internal parameter matrix of the first camera, $f_{xB}$, $f_{yB}$, $U_B$, $V_B$ indicates an external parameter matrix of the second camera, z indicates a distance value from current eyes to the first camera, s indicates an abscissa difference between original points of the first camera and the second camera, t indicates an ordinate difference between the original points of the first camera and the second camera, $u_B$ indicates an abscissa value of a pupil position coordinate, and $v_B$ indicates an ordinate value of the pupil position coordinate.

In an exemplary implementation, the gesture recognition apparatus includes a gesture recognition hardware module and a gesture recognition algorithm module, wherein the gesture recognition hardware module includes a third camera, a fourth camera, and a second processor; acquiring, by the gesture recognition apparatus, gesture position coordinates includes: collecting, by the fourth camera, a gesture image, and acquiring, by the third camera, a distance from the gesture to the fourth camera; acquiring, by the second processor, the gesture image and the distance from the gesture to the fourth camera, and sending the gesture image and the distance from the gesture to the fourth camera to the gesture recognition algorithm module; acquiring, by the gesture recognition algorithm module, according to the gesture image, coordinates of the gesture in the fourth camera, and acquiring the gesture position coordinates according to the coordinates of the gesture in the fourth camera and the distance from the gesture to the fourth camera through the following operation:

$$X = \frac{(u - u') * d}{fx};$$

$$Y = \frac{(v - v') * d}{fy};$$

fx, fy, u', v' indicates an internal parameter matrix of the fourth camera, u, v indicates coordinates of the gesture in an image of the fourth camera, and d indicates the distance from the gesture to the fourth camera.

In an exemplary implementation, the eye movement tracking hardware module further includes a first fill light, and the method further includes: detecting, by the first processor, an intensity of external light rays, and turns on the first fill light when the intensity of the external light rays is less than a threshold intensity and the first camera and/or the second camera are in a collection state.

In an exemplary implementation, the gesture recognition hardware module further includes a second fill light, and the method further includes: detecting, by the second processor, the intensity of the external light rays, and turns on the second fill light when the intensity of the external light rays is less than a threshold intensity and the third camera and/or the fourth camera are in a collection state.

In an exemplary implementation, a wavelength of light rays emitted by the first fill light is different from a wavelength of light rays emitted by the second fill light.

In an exemplary implementation, the first camera is an RGB camera, the second camera and the fourth camera are IR cameras, and the third camera is a depth camera.

In a third aspect, an embodiment of the present disclosure further provides a gaze demarcating apparatus, including a memory, a processor, and a computer program stored in the memory and runnable on the processor, to perform: acquiring pupil position coordinates and gesture position coordinates; in a process in which a gesture interacts with a display region, acquiring a plurality of groups of effective gaze coordinates and a plurality of groups of effective gaze pupil position coordinates corresponding to the plurality of groups of effective gaze coordinates according to the gesture position coordinates and the pupil position coordinates that are acquired, wherein the plurality of groups of effective gaze coordinates correspond to different interaction positions in the display region; calculating, according to the plurality of groups of effective gaze coordinates and the corresponding plurality of groups of effective gaze pupil position coordinates, a gaze mapping model to complete gaze demarcating.

In a fourth aspect, an embodiment of the present disclosure further provides a non-transitory computer-readable storage medium, configured to store computer program instructions, wherein when the computer program instructions are run, the gaze demarcating method according to any one of the above embodiments can be implemented.

Other aspects may be understood upon reading and understanding the drawings and the detailed description.

BRIEF DESCRIPTION OF DRAWINGS

The drawings are intended to provide a further understanding of technical solutions of the present disclosure and form a part of the specification, and are used to explain the technical solutions of the present disclosure together with embodiments of the present disclosure, and not intended to form limitations on the technical solutions of the present disclosure. Shapes and sizes of each component in the drawings do not reflect actual scales, and are only intended to schematically illustrate contents of the present disclosure.

FIG. 1 is a schematic diagram of a structure of a gaze demarcating system according to an embodiment of the present disclosure.

FIG. 2 is a flowchart of a gaze demarcating method according to an embodiment of the present disclosure.

DETAILED DESCRIPTION

Figure 3:
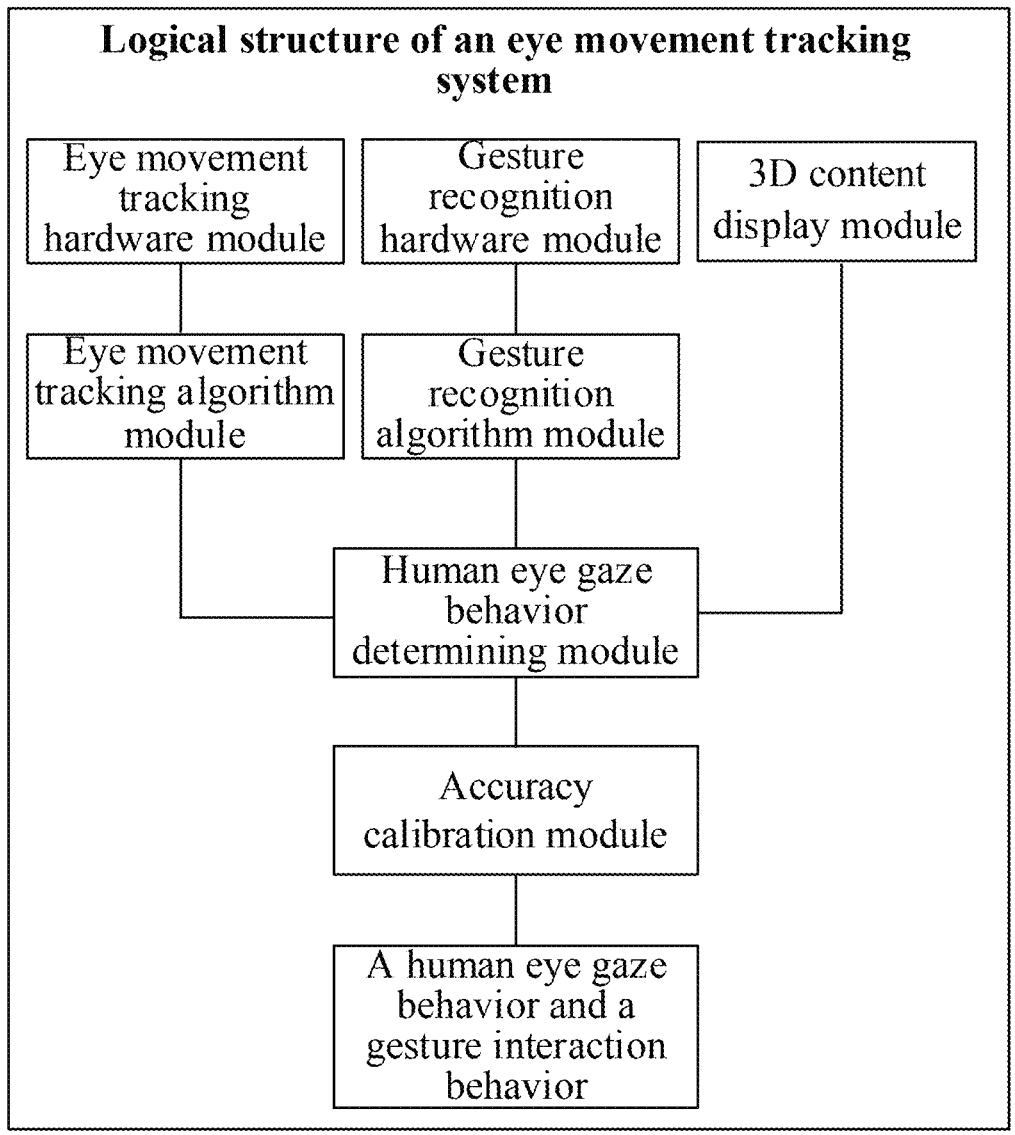
FIG. 3 is a schematic diagram of a logical structure of an eye movement tracking system according to an exemplary embodiment of the present disclosure.

The embodiments of the present disclosure will be described in detail below with reference to the drawings. Implementations may be implemented in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to conventional designs.

Ordinal numerals such as "first", "second", "third", and the like in the specification are for avoiding a confusion of constituent elements, but not for setting a limit in quantity.

In a desktop-type eye movement tracking (EyeTracking) system, a demarcating process is relatively fussy and error-prone, which often leads to a demarcating failure and a relatively poor accuracy of a gaze calculation; and in a subsequent use process, a problem that an accuracy of eye movement tracking and a gesture position calculation is decreased also exists.

An embodiment of the present disclosure provides a gaze demarcating system, as shown in FIG. 1, which may include: an eye movement tracking apparatus 11, a gesture recognition apparatus 12, a display interaction apparatus 13, and a gaze behavior determining apparatus 14; the eye movement tracking apparatus 11 is configured to acquire pupil position coordinates; the gesture recognition apparatus 12 is configured to acquire gesture position coordinates; the display interaction apparatus 13 is configured to interact with a gesture; and the gaze behavior determining apparatus 14 is respectively connected with the eye movement tracking apparatus 11, the gesture recognition apparatus 12, and the display interaction apparatus 13, and is configured to, in a process in which the display interaction apparatus 13 interacts with the gesture, obtain a plurality of groups of effective gaze coordinates and a plurality of groups of effective gaze pupil position coordinates corresponding to the plurality of groups of effective gaze coordinates according to the gesture position coordinates and the pupil position coordinates that are acquired, wherein the plurality of groups of effective gaze coordinates correspond to different interaction positions in the display region; and according to the plurality of groups of effective gaze coordinates and the corresponding a plurality of groups of effective gaze pupil position coordinates, calculate a sight mapping model to complete sight demarcating.

For the gaze demarcating system according to the embodiment of the present disclosure, in the process in which the display interaction apparatus interacts with the gesture, a plurality of groups of effective gaze coordinates and a plurality of groups of effective gaze pupil position coordinates corresponding to the plurality of groups of effective gaze coordinates are acquired according to the gesture position coordinates and the pupil position coordinates that are acquired, and the gaze mapping model is calculated according to the plurality of groups of effective gaze coordinates and the corresponding a plurality of groups of effective gaze pupil position coordinates to calculate a gaze mapping model and complete gaze demarcating. The gaze demarcating system according to the embodiment of the present disclosure can overcome problems of a fussy gaze demarcating process and an error-prone demarcating process, which reduces a risk of a gaze demarcating failure to a certain extent.

In an embodiment of the present disclosure, the gaze demarcating system may be understood as an eye movement tracking system, that is, the eye movement tracking system may achieve a function of gaze demarcating.

In an implementation of the present disclosure, the display interaction apparatus may be a three-dimensional display interaction apparatus.

In an exemplary implementation, the eye movement tracking apparatus 11 may be configured to: acquire a pupil image, calculate pupil position coordinates according to the pupil image, add a time stamp to any one of the pupil position coordinates, establish a corresponding relationship between the pupil position coordinates and the time stamp, and store pupil position coordinates in shortest effective gaze time of a preset times before a current time node and a corresponding time stamp; wherein, the shortest effective gaze time is a time experience value of gazing an interaction position before the gesture falls to the interaction position; and the gesture recognition apparatus is configured to calculate the gesture position coordinates according to the gesture image.

In an exemplary implementation, the gaze behavior determining apparatus 11 may be configured to: detect whether the gesture interacts with the display region, and record gesture position coordinates at current time when detecting a state in which the gesture interacts with the display region; determine whether the gesture position coordinates at the current time are located in an interaction region of the display region, and in a state in which it is determined that the gesture position coordinates at the current time are located in the interaction region of the display region, acquire a group of effective gaze coordinates according to the gesture position coordinates at the current time, and acquire corresponding effective gaze pupil position coordinates according to the acquired pupil position coordinates; and determine whether a quantity of effective gaze coordinates and a quantity of corresponding effective gaze pupil position coordinates reach a preset group quantity, and in a state in which the quantity of the effective gaze coordinates and the quantity of the corresponding effective gaze pupil position coordinates reach the preset group quantity, calculate the gaze mapping model according to the plurality of groups of effective gaze coordinates and the corresponding a plurality of groups of effective gaze pupil position coordinates; and in a state in which the quantity of the effective gaze coordinates and the quantity of the corresponding effective gaze pupil position coordinates do not reach the preset group quantity, continue to detect whether the gesture interacts with the display region.

In an exemplary implementation, the gaze behavior determining apparatus 11 may be configured to: according to the corresponding relationship between the pupil position coordinates and the time stamp, and the stored time stamp, acquire a plurality of pupil position coordinates in latest saved shortest effective gaze time before the current time; sort a plurality of pupil position coordinates, delete largest n values and smallest n values, and average remaining pupil position coordinates to obtain effective gaze pupil position coordinates corresponding to effective gaze coordinates at the current time, wherein the n is a positive integer greater than or equal to 1 and less than a quantity of pupil position coordinates.

In an exemplary implementation, the gaze behavior determining apparatus 11 may be configured to: acquire a plurality of gesture position coordinates in shortest effective interaction time after the current time, sort a plurality of gesture position coordinates, delete largest n values and smallest n values, and average remaining gesture position coordinates to obtain the effective gaze coordinates at the current time, wherein the n is a positive integer greater than or equal to 1 and less than a quantity of gesture position coordinates.

In an exemplary implementation, the gaze behavior determining apparatus 11 may be configured to: acquire a boundary coordinate data set of the display region, and when the gesture position coordinates are located within a range of the boundary coordinate data set of the display region, determine that the gesture interacts with the display region.

In an exemplary implementation, the gaze behavior determining apparatus 11 may be configured to: acquire a boundary coordinate data set of a display interaction region, and when the gesture position coordinates are located within a range of the boundary coordinate data set of the display interaction region, determine that the gesture position coordinates are located in the interaction region with the display region.

In an exemplary implementation, the eye movement tracking apparatus 11 may be configured to acquire gaze point coordinates; the gesture recognition apparatus 12 may be configured to acquire gesture pausing point coordinates; the display interaction apparatus 13 may be configured to send data of the current display interaction region to the gaze behavior determining apparatus; and the gaze behavior determining apparatus 14 may be configured to acquire data of the display interaction region, determine whether the eyes are in an effective gaze state according to the gaze point coordinates and the data of the display interaction region that are acquired, determine whether is the hand is in an effective interaction state according to the gesture pausing point coordinates and the data of the display interaction region that are acquired, and when determining that the eyes are in the effective gaze state and the hand is in the effective interaction state, calculate an average value of a plurality of gaze point coordinates in effective gaze time, and calculate an average value of a plurality of gesture pausing points in effective interaction time; calibrate the gaze point coordinates according to the data of the display interaction region and the average value of the plurality of gaze point coordinates; and compensate the gesture pausing point coordinates according to the average value of the plurality of gesture pausing points.

In an exemplary implementation, the gaze behavior determining apparatus 11 may be configured to calculate center coordinates of data of current display interaction region by taking data of the display interaction region closest to the average value of the plurality of gaze point coordinates and the average value of the plurality of gesture pausing point coordinates as the data of current display interaction region; calculate a difference between the average value of the plurality of gaze points coordinates and the center coordinates to obtain a first difference; calculate a difference between the average value of the plurality of gestures pausing point coordinates and the central coordinate to obtain a second difference; compensate the gaze point coordinates according to the first difference, and compensate the gesture pausing point coordinates according to the second difference.

In an exemplary implementation, the gaze behavior determining apparatus 11 may be configured to calibrate the gaze mapping model according to the first difference and the second difference.

In an exemplary implementation, the gaze behavior determining apparatus 11 may be configured to: when a plurality of gaze point coordinates within preset time are each located near the data of the display interaction region or within a range of the data of the display interaction region, determine that the gaze point coordinates are in an effective gaze state.

In an exemplary implementation, the gaze behavior determining apparatus 11 may be configured to: when a plurality of gesture pausing point coordinates within preset time are each located near the data of the display interaction region or within a range of the data of the display interaction region, determine that the gesture pausing point coordinates are in an effective interaction state.

In an exemplary implementation, the eye movement tracking apparatus 11 may include an eye movement tracking hardware module and an eye movement tracking algorithm module, wherein the eye movement tracking hardware module includes a first camera, a second camera, and a first processor; the first camera is configured to collect a human face image; the second camera is configured to collect a pupil image; the first processor is connected with the first camera and the second camera, and is configured to acquire the human face image and the pupil image, and send the human face image and the pupil image to the eye movement tracking algorithm module; the eye movement tracking algorithm module is electrically connected with the eye movement tracking hardware module, and is configured to locate human eye coordinates according to the human face image through a human face algorithm, and acquire pupil position coordinates according to the pupil image by adopting the following formula for the human eye coordinates:

$$u_B = \frac{f_{xB}(u_A - U_A)}{f_{xA}} + U_B + \frac{f_{xB} * s}{z};$$

$$v_B = \frac{f_{yB}(v_A - V_A)}{f_{yA}} + V_B + \frac{f_{xB} * t}{z};$$

wherein, $f_{xA}$, $f_{yA}$, $U_A$, $V_A$ indicates an internal parameter matrix of the first camera, $f_{xB}$, $f_{yB}$, $U_B$, $V_B$ indicates an external parameter matrix of the second camera, z indicates a distance value from current eyes to the first camera, s indicates an abscissa difference between original points of the first camera and the second camera, t indicates an ordinate difference between the original points of the first camera and the second camera, $u_B$ indicates an abscissa value of pupil position coordinates, and $v_B$ indicates an ordinate value of the pupil position coordinates.

In an exemplary implementation, the gesture recognition apparatus 12 may include a gesture recognition hardware module and a gesture recognition algorithm module, wherein the gesture recognition hardware module includes a third camera, a fourth camera, and a second processor; the third camera is configured to acquire a distance from the gesture to the fourth camera; the fourth camera is configured to collect a gesture image; the second processor is connected with the third camera and the fourth camera, and is configured to acquire the gesture image and the distance from the gesture to the fourth camera, and send the gesture image and the distance from the gesture to the fourth camera to the gesture recognition algorithm module; the eye movement tracking algorithm module is electrically connected with the gesture recognition hardware module, and is configured to acquire coordinates of the gesture in the fourth camera according to the gesture image, and perform the following operation on the coordinates of the gesture in the fourth camera and the distance from the gesture to the fourth camera to acquire gesture position coordinates:

$$X = \frac{(u - u') * d}{fx};$$

$$Y = \frac{(v - v') * d}{fy};$$

fx, fy, u', v' indicates an internal parameter matrix of the fourth camera, u, v indicates coordinates of the gesture in an image of the fourth camera, and d indicates the distance from the gesture to the fourth camera.

In an exemplary implementation, the eye movement tracking hardware module may also include a first fill light, and the first processor may be configured to detect an intensity of external light rays, and turn on the first fill light when the intensity of the external light rays is less than a threshold intensity and the first camera and/or the second camera are in a collection state.

In an exemplary implementation, the gesture recognition hardware module may include a second fill light, and the second processor is configured to detect an intensity of external light rays, and turn on the second fill light when the intensity of the external light rays is less than a threshold intensity and the third camera and/or the fourth camera are in a collection state.

In an exemplary implementation, a wavelength of light rays emitted by the first fill light is different from a wavelength of light rays emitted by the second fill light.

In an exemplary implementation, the first fill light and the second fill light may emit infrared light. In an exemplary implementation, the first fill light emits infrared light having a wavelength of about 850 nm, and the second fill light sends infrared light having a wavelength of about 940 nm.

In an exemplary implementation, the first camera is an RGB camera (i.e. a color camera), the second camera and the fourth camera are IR cameras (i.e. infrared cameras), and the third camera is a depth camera.

An embodiment of the present disclosure further provides a gaze demarcating method, which is applied to the gaze demarcating system described in any of the above embodiments. As shown in FIG. 2, the gaze demarcating method may include acts S1 to S3.

In the act S1, an eye movement tracking apparatus acquires pupil position coordinates, and a gesture recognition apparatus acquires gesture position coordinates.

In the act S2, a gaze behavior determining apparatus obtains a plurality of groups of effective gaze coordinates and a plurality of groups of effective gaze pupil position coordinates corresponding to the plurality of groups of effective gaze coordinates according to the gesture position coordinates and the pupil position coordinates that are acquired in a process in which a gesture interacts with a display region, wherein the plurality of groups of effective gaze coordinates correspond to different interaction positions in the display region.

In the act S3, the gaze behavior determining apparatus calculates, according to the plurality of groups of effective gaze coordinates and the corresponding a plurality of groups of effective gaze pupil position coordinates, a gaze mapping model to complete gaze demarcating.

For the gaze demarcating method according to the embodiment of the present disclosure, in a process in which the gesture interacts with the display region, a plurality of groups of effective gaze coordinates and a plurality of groups of effective gaze pupil position coordinates corresponding to the plurality of groups of effective gaze coordinates are acquired according to the gesture position coordinates and the pupil position coordinates that are acquired, and the gaze mapping model is calculated according to the plurality of groups of effective gaze coordinates and the corresponding a plurality of groups of effective gaze pupil position coordinates to complete gaze demarcating. The gaze demarcating method according to the embodiment of the present disclosure can overcome problems of a fussy gaze demarcating process and an error-prone demarcating process, which reduces a risk of a gaze demarcating failure to a certain extent.

In the embodiment of the present disclosure, the gaze demarcating method completes demarcating in a use process of a user without special demarcating, and completes the gaze demarcating in a case of a gesture operation of the user with no awareness, which greatly improves a use experience of an eye movement tracking device and solves problems of relatively fussy and error-prone demarcating of a traditional eye movement tracking system.

In an exemplary implementation, the act S1 may include acts S11 to S13.

In the act S11, the eye movement tracking apparatus acquires a pupil image, and the gesture recognition apparatus acquires a gesture image.

In the act S12, the eye movement tracking apparatus calculates pupil position coordinates according to the pupil image, adds a time stamp to any one of the pupil position coordinates, establishes a corresponding relationship between the pupil position coordinates and the time stamp, and stores pupil position coordinates in shortest effective gaze time of a preset multiple before a current time node and a corresponding time stamp; wherein, the shortest effective gaze time is a time experience value of gazing an interaction position before the gesture falls to the interaction position.

In the act S13, the gesture recognition apparatus calculates gesture position coordinates according to the acquired gesture image.

In an exemplary implementation, in the act S2, the gaze behavior determining apparatus acquires a plurality of groups of effective gaze coordinates and a plurality of groups of effective gaze pupil position coordinates corresponding to the plurality of groups of effective gaze coordinates according to the gesture position coordinates and the pupil position coordinates that are acquired, which may include acts S21 to S23.

The act S21 is: detecting whether the gesture interacts with the display region, and recording gesture position coordinates at current time when detecting a state in which the gesture interacts with the display region.

The act S22 is: determining whether the gesture position coordinates at the current time are located in an interaction region of the display region, and in a state in which it is determined that the gesture position coordinates at the current time are located in the interaction region of the display region, acquiring a group of effective gaze coordinates according to the gesture position coordinates at the current time, and acquiring corresponding effective gaze pupil position coordinates according to the acquired pupil position coordinates.

The act S23 is: determining whether a quantity of effective gaze coordinates and a quantity of corresponding effective gaze pupil position coordinates reach a preset group quantity, and in a state in which the quantity of the effective gaze coordinates and the quantity of the corresponding effective gaze pupil position coordinates reach the preset group quantity, calculating the gaze mapping model according to the plurality of groups of effective gaze coordinates and the corresponding a plurality of groups of effective gaze pupil position coordinates; and in a state in which the quantity of the effective gaze coordinates and the quantity of the corresponding effective gaze pupil position coordinates do not reach the preset group quantity, continuing to detect whether the gesture interacts with the display region.

In an exemplary implementation, acquiring corresponding effective gaze pupil position coordinates according to the acquired pupil position coordinates in the act S22 may include: according to the corresponding relationship between the pupil position coordinates and the time stamp, and the stored time stamp, acquiring a plurality of pupil position coordinates in latest saved shortest effective gaze time before the current time; sorting a plurality of pupil position coordinates, deleting largest n values and smallest n values, and averaging remaining pupil position coordinates to obtain effective gaze pupil position coordinates corresponding to effective gaze coordinates at the current time, wherein the n is a positive integer greater than or equal to 1 and less than a quantity of pupil position coordinates.

In an exemplary implementation, acquiring a group of effective gaze coordinates according to the gesture position coordinates at the current time in the act S22 may include: acquiring a plurality of gesture position coordinates in shortest effective interaction time after the current time, sorting a plurality of gesture position coordinates, deleting largest n values and smallest n values, and averaging remaining gesture position coordinates to obtain the effective gaze coordinates at the current time, wherein the n is a positive integer greater than or equal to 1 and less than a quantity of gesture position coordinates.

In an exemplary implementation, detecting whether the gesture interacts with the display region in the act S22 may include: acquiring a boundary coordinate data set of the display region, and when the gesture position coordinates are located within a range of the boundary coordinate data set of the display region, determining that the gesture interacts with the display region.

In an exemplary implementation, determining whether the gesture position coordinates at the current time are located in an interaction region of the display region in the act S22 may include: acquiring a boundary coordinate data set of a display interaction region, and when the gesture position coordinates are located within a range of the boundary coordinate data set of the display interaction region, determining that the gesture position coordinates are located in the interaction region with the display region.

In an exemplary implementation, after the act S3, it further includes acts S41 to S43.

In the act S41, the eye movement tracking apparatus acquires gaze point coordinates, and the gesture recognition apparatus acquires gesture pausing point coordinates.

In the act S42, the gaze behavior determining apparatus acquires data of the display interaction region, determines whether the eyes are in an effective gaze state according to the gaze point coordinates and the data of the display interaction region that are acquired, determines whether the hand is in an effective interaction state according to the gesture pausing point coordinates and the data of the display interaction region that are acquired, and when determining that the eyes are in the effective gaze state and the hand is in the effective interaction state, calculates an average value of a plurality of gaze point coordinates in effective gaze time, and calculates an average value of a plurality of gesture pausing points in effective interaction time.

In the act S43, the gaze behavior determining apparatus compensates the gaze point coordinates according to the data of the display interaction region and the average value of the plurality of gaze point coordinates; and compensates the gesture pausing point coordinates according to the average value of the plurality of gesture pausing points.

In an embodiment of the present disclosure, after the gaze demarcating is completed, a user may use the eye movement tracking system and a gesture interaction function. However, there may be relatively large errors in eye movement tracking and a gesture recognition position calculation. Gaze point coordinates and gesture interaction data may continue to be collected in real time, combined with a 3D display interaction region in a 3D display module, a human eye gaze behavior determining module continuously calibrates a gaze accuracy and a gesture accuracy, thereby gradually improving a calculation accuracy of a gesture position and a gaze calculation accuracy of the eye movement tracking system, which can effectively prevent a problem of a low accuracy caused by a decrease of an accuracy after the gaze demarcating or an inaccurate result obtained by the gaze demarcating.

In an exemplary implementation, the act S43 may include acts S431 to S433.

In act S431: calculating center coordinates of the data of the current display interaction region by taking data of the display interaction region closest to the average value of the plurality of gaze point coordinates and the average value of the plurality of gesture pausing point coordinates as the data of the current display interaction region.

In act S432: calculating a difference between the average value of the plurality of gaze points coordinates and the center coordinates to obtain a first difference; and calculating a difference between the average value of the plurality of gestures pausing point coordinates and the central coordinate to obtain a second difference.

The act S433 is: compensating the gaze point coordinates according to the first difference, and compensating the gesture pausing point coordinates according to the second difference.

In an exemplary implementation, after the act S432, it may include: calibrating the gaze mapping model according to the first difference and the second difference.

In an exemplary implementation, determining whether it is in an effective gaze state according to the gaze point coordinates and the data of the display interaction region in the act S42 may include: when a plurality of gaze point coordinates within preset time are each located near the data of the display interaction region or within a range of the data of the display interaction region, determining that the gaze point coordinates are in an effective gaze state.

In an exemplary implementation, determining whether it is in an effective interaction state according to the gesture pausing point coordinates and the data of the display interaction region in the act S42 may include: when a plurality of gesture pausing point coordinates within preset time are each located near the data of the display interaction region or within a range of the data of the display interaction region, determining that the gesture pausing point coordinates are in an effective interaction state.

In an exemplary implementation, the eye movement tracking apparatus includes an eye movement tracking hardware module and an eye movement tracking algorithm module, wherein the eye movement tracking hardware module includes a first camera, a second camera, and a first processor; the eye movement tracking apparatus acquires pupil position coordinates, which includes: the first camera collects a human face image, and the second camera collects a pupil image; the first processor acquires the human face image and the pupil image, and sends the human face image and the pupil image to the eye movement tracking algorithm module; the eye movement tracking algorithm module locates human eye coordinates according to the human face image through a human face algorithm, and performs the following operation on the human eye coordinates according to the pupil image to acquire the pupil position coordinates:

$$u_B = \frac{f_{xB}(u_A - U_A)}{f_{xA}} + U_B + \frac{f_{xB} * s}{z};$$

$$v_B = \frac{f_{yB}(v_A - V_A)}{f_{yA}} + V_B + \frac{f_{xB} * t}{z};$$

wherein, $f_{xA}$, $f_{yA}$, $U_A$, $V_A$ indicates an internal parameter matrix of the first camera, $f_{xB}$, $f_{yB}$, $U_B$, $V_B$ indicates an external parameter matrix of the second camera, z indicates a distance value from current eyes to the first camera, s indicates an abscissa difference between original points of the first camera and the second camera, t indicates an ordinate difference between the original points of the first camera and the second camera, $u_B$ indicates an abscissa value of a pupil position coordinate, and $v_B$ indicates an ordinate value of the pupil position coordinate.

In an exemplary implementation, the gesture recognition apparatus includes a gesture recognition hardware module and a gesture recognition algorithm module, wherein the gesture recognition hardware module includes a third camera, a fourth camera, and a second processor; the gesture recognition apparatus acquires the gesture position coordinates, which includes: the fourth camera collects a gesture image, and the third camera acquires a distance from the gesture to the fourth camera; the second processor acquires the gesture image and the distance from the gesture to the fourth camera, and sends the gesture image and the distance from the gesture to the fourth camera to the gesture recognition algorithm module; the gesture recognition algorithm module acquires coordinates of the gesture in the fourth camera according to the gesture image, and acquires gesture position coordinates according to the coordinates of the gesture in the fourth camera and the distance from the gesture to the fourth camera through the following operation:

$$X = \frac{(u-u')*d}{fx};$$

$$Y = \frac{(v-v')*d}{fy};$$

fx, fy, u', v' indicates an internal parameter matrix of the fourth camera, u, v indicates coordinates of the gesture in an image of the fourth camera, and d indicates the distance from the gesture to the fourth camera.

In an exemplary implementation, the eye movement tracking hardware module also includes a first fill light, and the method further includes: the first processor detects an intensity of external light rays, and turns on the first fill light when the intensity of the external light rays is less than a threshold intensity and the first camera and/or the second camera are in a collection state.

In an exemplary implementation, the gesture recognition hardware module also includes a second fill light, and the method further includes: the second processor detects the intensity of the external light rays, and turns on the second fill light when the intensity of the external light rays is less than a threshold intensity, and the third camera and/or the fourth camera are in a collection state.

In an exemplary implementation, a wavelength of light rays emitted by the first fill light is different from a wavelength of light rays emitted by the second fill light.

In an exemplary implementation, the first camera is an RGB camera (i.e. a color camera), the second camera and the fourth camera are IR cameras (i.e. infrared cameras), and the third camera is a depth camera.

Figure 4:
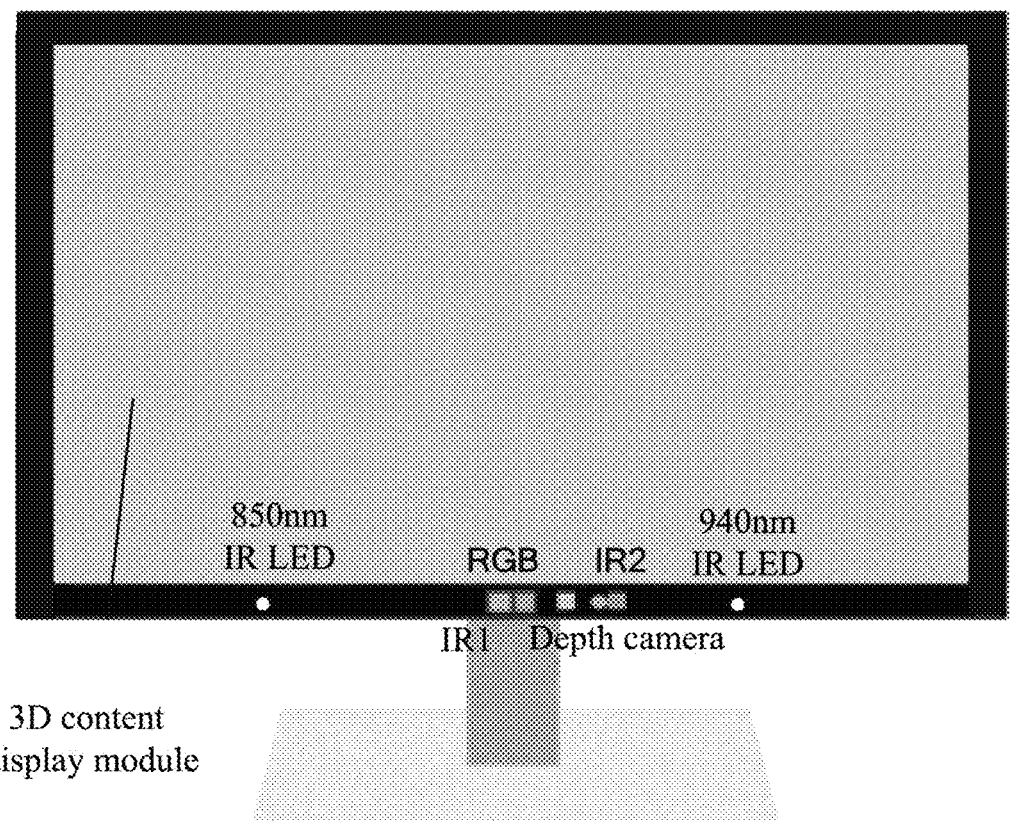
FIG. 4 is a schematic diagram of a structure of an eye movement tracking system according to an exemplary embodiment of the present disclosure.

A logical structure of the eye movement tracking system involved in the embodiment of the present disclosure is shown in FIG. 3, including an eye movement tracking (EyeTracking) hardware module, a gesture recognition hardware module, an eye movement tracking (EyeTracking) algorithm module, a gesture recognition algorithm module, a 3D content display module, a human eye gaze behavior determining module, a precision calibration module, a human eye gaze behavior, and a gesture interaction behavior. FIG. 4 shows a schematic diagram of a structure of the eye movement tracking system; Herein: the eye movement tracking hardware module includes one RGB camera, one (or more) IR camera, and one (or more) 850 nm infrared fill light, as shown in FIG. 4, the module is mainly configured to collect human face and pupil images and transmit the images to the eye movement tracking algorithm module; the gesture recognition hardware module includes one depth camera, one IR camera, and one 940 nm infrared fill light, as shown in FIG. 4. Because an infrared fill light is used in both the EyeTracking hardware module and a gesture recognition, in order to avoid an influence of the infrared fill light of the EyeTracking hardware module on the gesture recognition, the 940 nm infrared fill light is selected and used in a gesture recognition hardware module; and the gesture recognition hardware module will transmit collected gesture image to the gesture recognition algorithm module; and the eye movement tracking algorithm module is mainly configured to a pupil detection and a gaze calculation; firstly, the module adopts a human face detection algorithm to locate human eye coordinates, and transforms the human eye coordinates into a pupil image according to the following formula, and cuts out a human eye region in the pupil image; next, the pupil detection is performed in the region to obtain pupil coordinates, and the pupil coordinates are transmitted to the human eye gaze behavior determining module;

$$u_B = \frac{f_{xB}(u_A - U_A)}{f_{xA}} + U_B + \frac{f_{xB}*s}{z}$$

$$v_B = \frac{f_{yB}(v_A - V_A)}{f_{yA}} + V_B + \frac{f_{xB}*t}{z}$$

In the above formula, a subscript A indicates an RGB camera and a subscript B indicates an IR camera; $f_{xA}$, $f_{yA}$, $U_A$, $V_A$ indicates an internal parameter matrix of the camera A, $f_{xB}$, $f_{yB}$, $U_B$, $V_B$ indicates an external parameter matrix of the camera B, z indicates a distance value from current human eyes to the RGB camera, s indicates an abscissa difference of origins of A camera and B camera, and t indicates an ordinate difference of the origins of the A camera and B camera; and in an embodiment of the present disclosure, because the RGB camera and the IR camera are located in a same plane, z may be understood as a vertical distance from the current human eyes to a plane in which the first camera and the second camera are located.

The gesture recognition algorithm module is mainly configured for a gesture recognition and a gesture position calculation; the module uses a pre-trained gesture model, inputs a gesture image captured by a current IR camera into a gesture model, calculates image coordinates of a current gesture and determines a current interaction gesture, and calculates a current gesture distance through a depth camera; coordinates of the gesture in a space are calculated according to the following formula, and after obtaining gesture position coordinates, the coordinates are transmitted to the human eye gaze behavior determining module;

$$X = \frac{(u-u')*d}{fx}$$

$$Y = \frac{(v-v')*d}{fy}$$

In the above formula, fx, fy, u', v' indicates an internal parameter matrix of the IR camera for the gesture recognition, u, v indicates coordinates of the gesture in an image of the IR camera, and d indicates a distance from the gesture to the depth camera; in an embodiment of the present disclosure, since the depth camera and the IR camera are located in a same plane, d may be understood as a vertical distance from the gesture to a plane on which the depth camera and the IR camera are located.

In an embodiment of the present disclosure, the RGB camera, the IR camera, and the fill light may all be disposed in a plane in which the display region is located. For example, the camera and the fill light may be disposed in a bezel region of a display screen.

In an embodiment of the present disclosure, the depth camera may be matched with a corresponding Software Development Kit (SDK) to calculate a depth when leaving the factory. A parameter of the depth camera is already contained in this SDK itself, and the parameter of the depth camera is used in the SDK. The vertical distance d from the gesture to the plane on which the depth camera and the IR camera are located may be obtained by calling this SDK for a depth calculation.

The 3D content display module is mainly configured to render, transmit, and display a current 3D content, and transmit data of a boundary region of the 3D content to the human eye gaze behavior determining module; the human eye gaze behavior determining module is mainly configured to determine a current human eye state, receive pupil movement data, gesture position data, and the data of the boundary region of the 3D content in real time, and screen out effective data when human eyes are gazing to achieve that EyeTracking completes demarcating without a user's awareness; and the accuracy calibration module: with a subsequent use process, gradually improve the EyeTracking gaze calculation accuracy and the gesture position calculation accuracy; and in an exemplary implementation, the accuracy calibration module may be a part of the human eye gaze behavior determining module.

The human eye gaze behavior and the gesture interaction behavior: when using a gesture interaction, human eyes generally first determine an interaction point in the 3D display content, that is, first gaze an interaction point region, and then the gesture moves to this position to perform a gesture interaction operation; that is, in a period of time before the gesture falls to the interaction position, the human eyes are in a state of gazing the interaction position, and shortest effective staring time t is generally determined by an empirical value.

Figure 5:
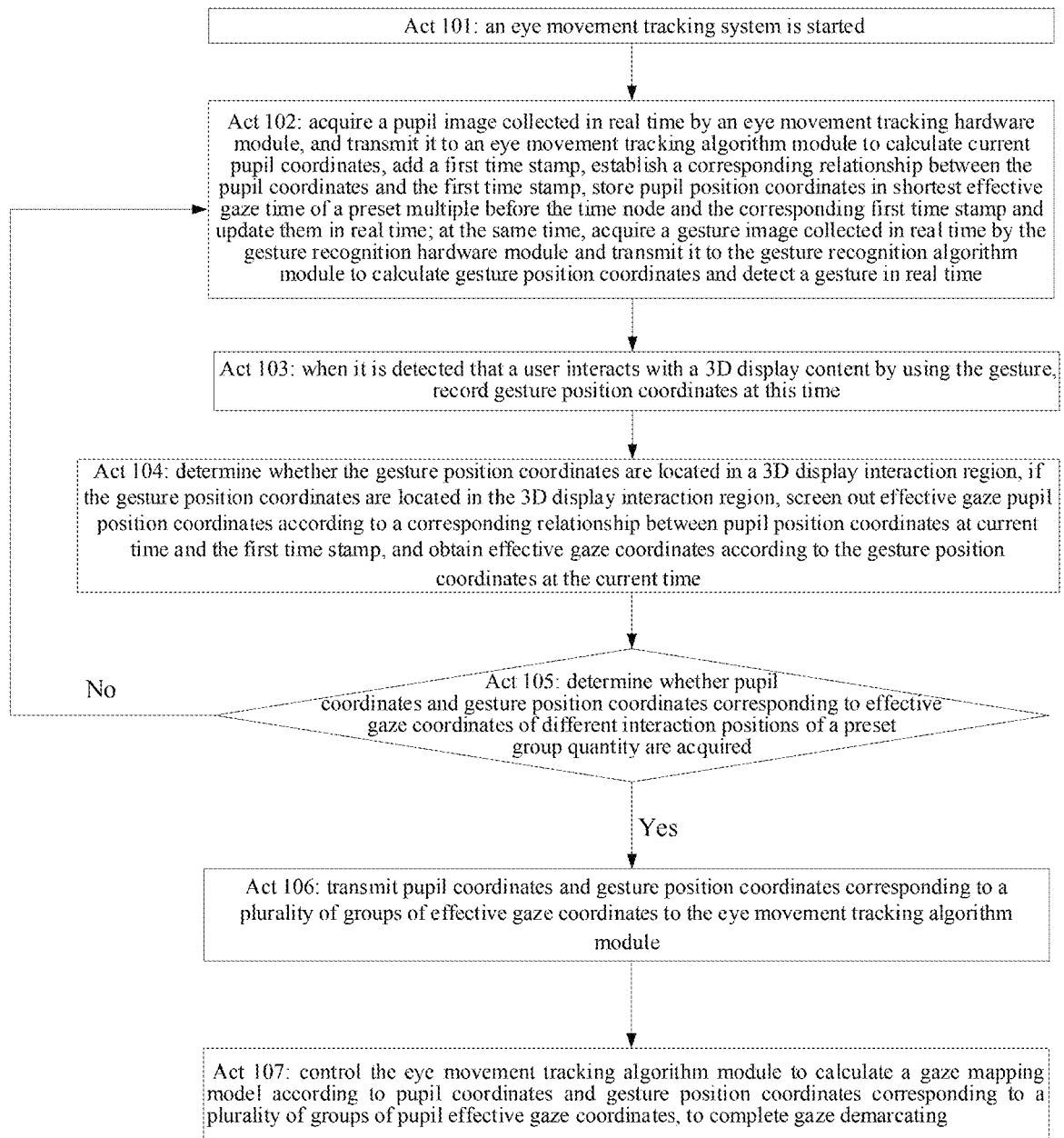
FIG. 5 shows a flowchart of a gaze demarcating method according to an exemplary embodiment of the present disclosure.

The method of gaze demarcating by the eye movement tracking system of FIG. 3 is described in detail below, as described in FIG. 5, which may include acts 101 to 106.

In the act 101, the eye movement tracking system is started.

In the act 102, a pupil image collected in real time by the eye movement tracking hardware module is acquired, and it is transmitted to the eye movement tracking algorithm module to calculate current pupil coordinates, a first time stamp is added, a corresponding relationship between the pupil coordinates and the first time stamp is established, pupil position coordinates in shortest effective gaze time of a preset multiple before the time node and the corresponding first time stamp are stored and updated in real time; at the same time, a gesture image collected in real time by the gesture recognition hardware module is acquired and transmitted to the gesture recognition algorithm module to calculate gesture position coordinates and detect a gesture in real time.

In an exemplary implementation, the shortest effective gaze time of the preset multiple may be two to five times the shortest effective gaze time, for example, the shortest effective gaze time of the preset multiple may be three times the shortest effective gaze time.

In an exemplary implementation, the shortest effective gaze time may be time that human eyes are in a state of gazing an interaction position before the gesture falls to the interaction position, which may generally be determined by an experience value. For example, it may be determined according to a distance between a hand and the interaction position, for example, the shortest effective gaze time may be 1 second to 6 seconds, or the shortest effective gaze time may be milliseconds, for example, the shortest effective gaze time may be 10 milliseconds to 50 milliseconds.

In the act 103, when it is detected that a user interacts with the 3D display content by using the gesture, gesture position coordinates at this time are recorded.

In an exemplary implementation, the human eye state is determined by the human eye gaze behavior determining module, and pupil movement data, as well as gesture position data during the interaction are acquired.

In the act 104, it is determined whether the gesture position coordinates are located in the 3D display interaction region, if the gesture position coordinates are located in the 3D display interaction region, effective gaze pupil position coordinates are screened out according to a corresponding relationship between pupil position coordinates at current time and the first time stamp, and effective gaze coordinates are obtained according to the gesture position coordinates at the current time.

In an exemplary implementation, the effective gaze coordinates are coordinates of a same point at which a gesture position and a fixating position are located (an interaction position).

In an exemplary implementation, effective gaze pupil position coordinates are screened out according to a corresponding relationship between pupil position coordinates at current time and the first time stamp, which may include acts L11 to L12.

In the act L11, according to the corresponding relationship between the pupil position coordinates and the first time stamp, and the stored first time stamp, a pupil coordinate data set in latest saved shortest effective time before the current time are acquired.

In the act L12, data in the pupil coordinate data set are sorted, largest n values and smallest n values are deleted, and remaining values are averaged as pupil coordinates when effective gazing occurs.

In an exemplary implementation of the present disclosure, a pausing point position of a gesture interaction will fluctuate in a small range near one point. Therefore, the gesture position may be calculated in a mode of "sorting-deleting a maximum value and a minimum value-averaging remaining values", and a result may be taken as current gaze point coordinates. A mode for acquiring gesture position coordinates may include an act L20.

In act L20, acquiring a plurality of gesture position coordinates in shortest effective interaction time after the current time, sorting the plurality of gesture position coordinates, deleting the largest n values and the smallest n values, and averaging remaining values to be taken as gesture position coordinates when effective gazing occurs. In an exemplary implementation, the current gaze point coordinates may be understood as gesture position coordinates when an effective gazing occurs.

In an exemplary implementation, the shortest effective interaction time may be acquired according to an interaction experience, for example, the shortest effective interaction time may be several milliseconds, for example, the shortest effective interaction time may be 1 millisecond to 10 milliseconds.

In act 105: determining whether pupil coordinates and gesture position coordinates corresponding to effective gaze coordinates of different interaction positions of a preset group quantity are acquired, if yes, executing the act 106, otherwise, executing the act 102.

In an exemplary implementation, pupil coordinates and gesture position coordinates corresponding to effective gaze position coordinates of different interaction positions of a preset group quantity may be pupil coordinates and gesture position coordinates corresponding to 5 or 9 groups of effective gaze coordinates at different interaction positions.

In an exemplary implementation, the acts 103 to 105 may be performed by controlling the human eye gaze behavior determining module.

In act 106: transmitting pupil coordinates and gesture position coordinates corresponding to a plurality of groups of effective gaze coordinates to the eye movement tracking algorithm module.

In act 107: controlling the eye movement tracking algorithm module to calculate a gaze mapping model according to pupil coordinates and gesture position coordinates corresponding to a plurality of groups of pupil effective gaze coordinates, to complete gaze demarcating.

In the embodiment of the present disclosure, the demarcating is completed during the use of the user through the above acts 102 to 107 without special demarcating, and the gaze demarcating is completed in a case of a gesture operation of the user with no awareness, which greatly improves a use experience of an eye movement tracking device and solves problems of relatively fussy and error-prone demarcating of a traditional eye movement tracking system.

Figure 6:
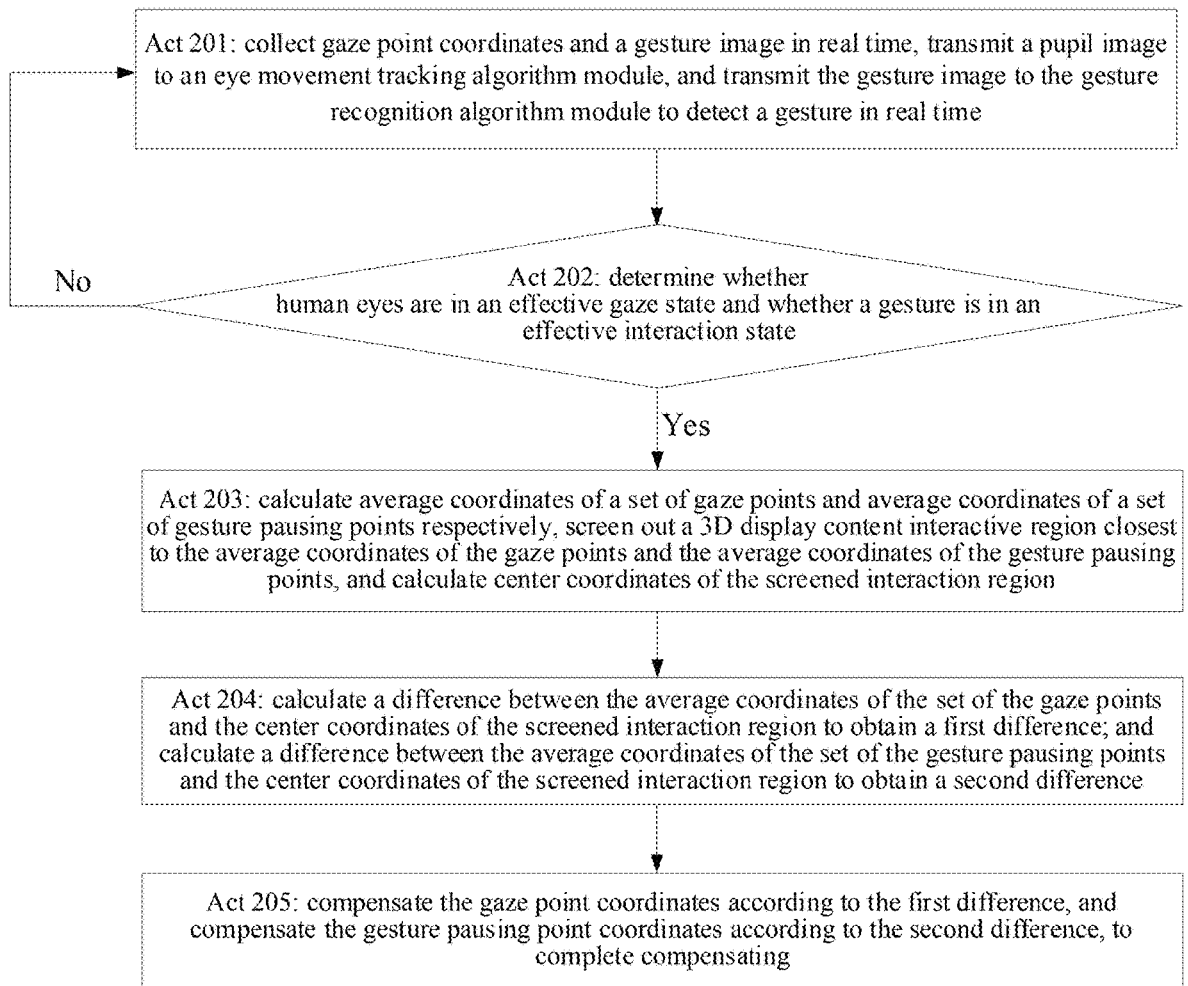
FIG. 6 is a flowchart of a method of a precision calibration by an eye movement tracking system according to an exemplary embodiment of the present disclosure.

In an embodiment of the present disclosure, after the gaze demarcating is completed, at this time, the user may use the eye movement tracking system and a gesture interaction function. However, there may be relatively large errors in eye movement tracking and a gesture recognition position calculation. Gaze point coordinates and gesture interaction data may continue to be collected in real time, combined with a 3D display interaction region in a 3D display module, the human eye gaze behavior determining module continuously calibrates a gaze accuracy and a gesture accuracy, thereby gradually improving a calculation accuracy of a gesture position and a gaze calculation accuracy of the eye movement tracking system, which can effectively prevent a problem of a low accuracy caused by a decrease of an accuracy after the gaze demarcating or an inaccurate result obtained by the gaze demarcating. A method of a precision calibration by the eye movement tracking system of FIG. 3 is described in detail below, and as shown in FIG. 6, the method of the precision calibration may include acts 201 to 206.

The act 201 is: collecting gaze point coordinates and a gesture image in real time, transmitting a pupil image to the eye movement tracking algorithm module, and transmitting the gesture image to the gesture recognition algorithm module to detect a gesture in real time.

The act 202 is: determining whether human eyes are in an effective gaze state and whether the gesture is in an effective interaction state, if yes, executing the act 203; otherwise, executing the act 201.

Figure 7:
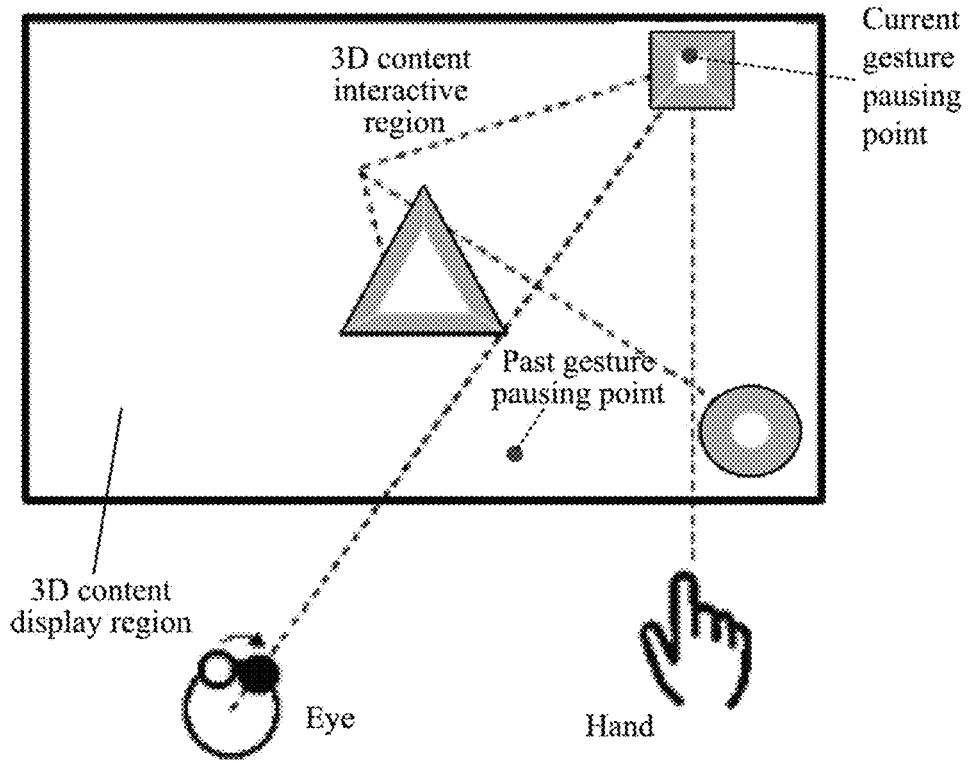
FIG. 7 and FIG. 8 show schematic diagrams of structures of gesture pausing points and gaze points in display interaction regions.
Figure 8:
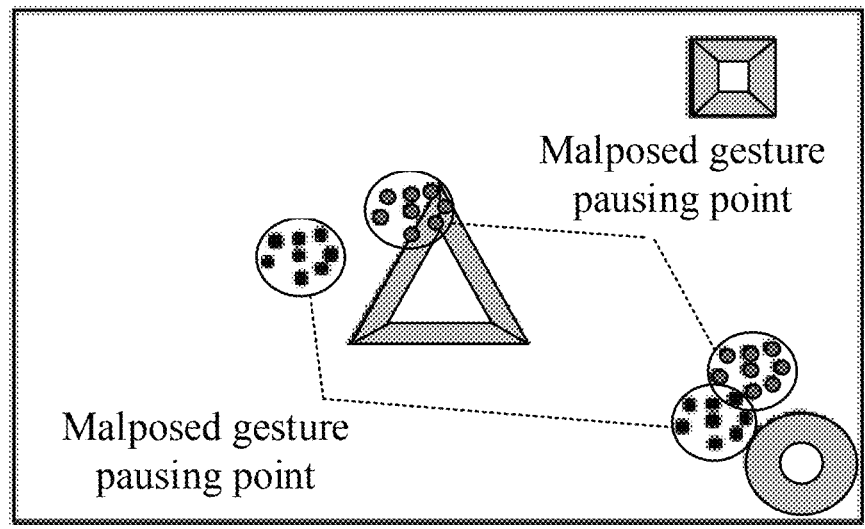

In an exemplary implementation, the act 202 may include: determining that the human eyes are in the effective gaze state and the gesture is in the effective interaction state, if the gesture pausing points are concentrated in a vicinity of a 3D display content interactive region for a period of time and at the same time gaze points are also concentrated in the vicinity of a 3D display interaction region. As shown in FIGS. 7 and 8, they are schematic diagrams of structures of gesture pausing points and gaze points in the 3D display interaction region. In an embodiment of the present disclosure, a gesture pausing point and a gesture pausing point position may both be understood as gesture position coordinates calculated and obtained by the gesture recognition apparatus or the gesture recognition module.

In an exemplary implementation, human eyes are in an effective gaze state and the gesture is in an effective interaction state, and it may be determined that the current user will perform an interaction operation with a location of the 3D display content.

In act 203: calculating average coordinates of a set of gaze points and average coordinates of a set of the gesture pausing points respectively, screening out the 3D display content interactive region closest to the average coordinates of the gaze points and the average coordinates of the gesture pausing points, and calculating center coordinates of the screened interaction region.

In act 204: calculating a difference between the average coordinates of the set of the gaze points and the center coordinates of the screened interaction region to obtain a first difference; and calculating a difference between the average coordinates of the set of the gesture pausing points and the center coordinates of the screened interaction region to obtain a second difference.

In act 205: compensating the gaze point coordinates according to the first difference, and compensating the gesture pausing point coordinates according to the second difference, to complete compensating.

In the embodiment of the present disclosure, it may be achieved by the above acts 201 to 205 that compensating for each gaze point is performed, so that an accuracy of the gaze point is more accurate.

In an exemplary implementation, after the act 204, it may include: calibrating the gaze mapping model according to the first difference and the second difference. Therefore, an accuracy of the gaze mapping model is more and more accurate.

Figure 9:
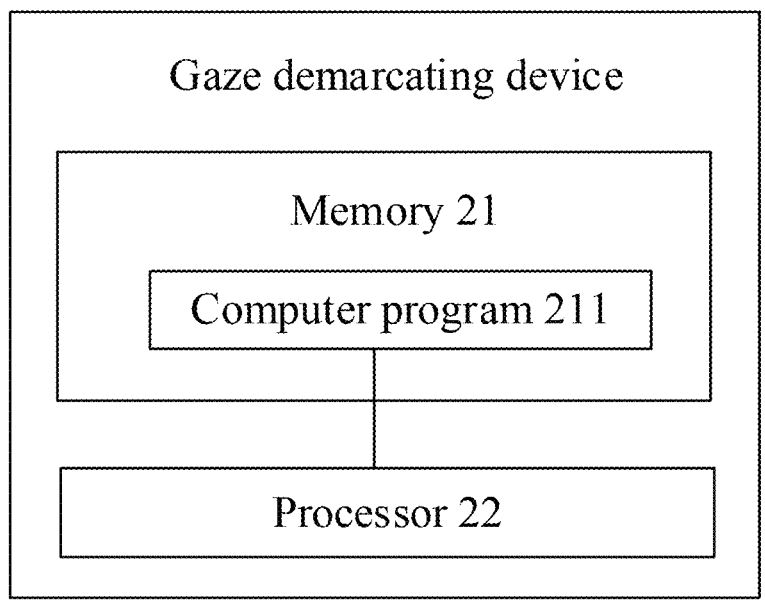
FIG. 9 shows a schematic diagram of a structure of a gaze demarcating device according to an embodiment of the present disclosure.

An embodiment of the present disclosure further provide a gaze demarcating device, as shown in FIG. 9, which may include a memory 21, a processor 22, and a computer program 211 stored on the memory 21 and runnable on the processor 22 to perform: acquiring pupil position coordinates and gesture position coordinates; in a process in which the gesture interacts with the display region, acquiring a plurality of groups of effective gaze coordinates and a plurality of groups of effective gaze pupil position coordinates corresponding to the plurality of groups of effective gaze coordinates according to the gesture position coordinates and the pupil position coordinates that are acquired, wherein the plurality of groups of effective gaze coordinates correspond to different interaction positions in the display region; and calculating, according to the plurality of groups of effective gaze coordinates and the corresponding a plurality of groups of effective gaze pupil position coordinates, a gaze mapping model to complete gaze demarcating.

An embodiment of the present disclosure further provides a non-transitory computer-readable storage medium, wherein the storage medium is configured to store computer program instructions, wherein when the computer program instructions are run, the gaze demarcating method according to any one of the above embodiments may be implemented.

For the gaze demarcating system, the method, the device, and the storage medium according to the embodiments of the present disclosure, the gaze demarcating method may, in a process of the gesture interacting with the display region, acquire a plurality of groups of effective gaze coordinates and a plurality of groups of effective gaze pupil position coordinates corresponding to the plurality of groups of effective gaze coordinates according to the gesture position coordinates and the pupil position coordinates that are acquired, and calculate the gaze mapping model according to the plurality of groups of effective gaze coordinates and the corresponding a plurality of groups of effective gaze pupil position coordinates to complete gaze demarcating. The gaze demarcating method according to the embodiment of the present disclosure can overcome occurrences of cases of a fussy gaze demarcating process and an error-prone demarcating process, which reduces a risk of a gaze demarcating failure to a certain extent.

It may be understood by those of ordinary skill in the art that all or some acts in a method and function modules/units in a system and an apparatus disclosed above may be implemented as software, firmware, hardware, and appropriate combinations thereof. In a hardware implementation mode, division of the function modules/units mentioned in the above description is not always corresponding to division of physical components. For example, a physical component may have a plurality of functions, or a function or an act may be executed by several physical components in cooperation. Some components or all components may be implemented as software executed by a processor such as a digital signal processor or a microprocessor, or implemented as hardware, or implemented as an integrated circuit such as an specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal, such as, a carrier or another transmission mechanism, and may include any information delivery medium.

The drawings of the embodiments of the present disclosure only involve structures involved in the embodiments of the present disclosure, and other structures may refer to usual designs.

The embodiments of the present disclosure, that is, features in the embodiments, may be combined with each other to obtain new embodiments if there is no conflict.

Although the implementation modes disclosed in the embodiments of the present disclosure are described above, contents are only implementation modes for facilitating understanding the embodiments of the present disclosure, which are not intended to limit the embodiments of the present disclosure. Those of skilled in the art to which the embodiments of the present disclosure pertain may make any modifications and variations in forms and details of implementation without departing from the spirit and scope of the embodiments of the present disclosure. Nevertheless, the scope of patent protection of the embodiments of the present disclosure shall still be subject to the scope defined by the appended claims.

The invention claimed is:

1. A gaze demarcating system, comprising: an eye movement tracking apparatus, a gesture recognition apparatus, a display interaction apparatus, and a gaze behavior determining apparatus, wherein;
the eye movement tracking apparatus is configured to acquire pupil position coordinates;
the gesture recognition apparatus is configured to acquire gesture position coordinates;
the display interaction apparatus is configured to interact with a gesture;
the gaze behavior determining apparatus is respectively connected with the eye movement tracking apparatus, the gesture recognition apparatus, and the display interaction apparatus, and is configured to, in a process of the display interaction apparatus interacting with the gesture, obtain a plurality of groups of effective gaze coordinates and a plurality of groups of effective gaze pupil position coordinates corresponding to the plurality of groups of effective gaze coordinates according to the acquired gesture position coordinates and pupil position coordinates, wherein the plurality of groups of effective gaze coordinates correspond to different interaction positions in a display region of the display interaction apparatus; and according to the plurality of groups of effective gaze coordinates and the corresponding plurality of groups of effective gaze pupil position coordinates, calculate a gaze mapping model to perform gaze demarcating;
the eye movement tracking apparatus is further configured to acquire gaze point coordinates;
the gesture recognition apparatus is further configured to acquire gesture pausing point coordinates;
the display interaction apparatus is further configured to send data of current display interaction region to the gaze behavior determining apparatus;
the gaze behavior determining apparatus is further configured to acquire the data of the current display interaction region, determine whether eyes are in an effective gaze state according to the acquired gaze point coordinates and the acquired data of the display interaction region, determine whether the gesture is in an effective interaction state according to the acquired gesture pausing point coordinates and the acquired data of the display interaction region, and determining that the eyes are in the effective gaze state and the gesture is in the effective interaction state, calculate an average value of a plurality of gaze point coordinates in effective gaze time, and calculate an average value of a plurality of gesture pausing points in effective interaction time; calibrate the gaze point coordinates according to the data of the display interaction region and the average value of the plurality of gaze point coordinates; and compensate the gesture pausing point coordinates according to the average value of the plurality of gesture pausing points; and
the gaze behavior determining apparatus is configured to:
calculate center coordinates of the data of the current display interaction region by taking data of the display interaction region closest to the average value of the plurality of gaze point coordinates and the average value of the plurality of gesture pausing point coordinates as the data of the current display interaction region;

calculate a difference between the average value of the plurality of gaze points coordinates and the center coordinates to obtain a first difference; calculate a difference between the average value of the plurality of gestures pausing point coordinates and the central coordinates to obtain a second difference; and compensate the gaze point coordinates according to the first difference, and compensate the gesture pausing point coordinates according to the second difference.

2. The gaze demarcating system of claim 1, wherein the eye movement tracking apparatus is configured to: acquire a pupil image, calculate the pupil position coordinates according to the pupil image, add a time stamp to any one of the pupil position coordinates, establish a corresponding relationship between the pupil position coordinates and the time stamp, and store pupil position coordinates in shortest effective gaze time of a preset multiple before a current time node and a corresponding time stamp, wherein the shortest effective gaze time is a time experience value of gazing an interaction position before the gesture falls to the interaction position; and the gesture recognition apparatus is configured to calculate the gesture position coordinates according to a gesture image.

3. The gaze demarcating system of claim 2, wherein the gaze behavior determining apparatus is configured to:

detect whether the gesture interacts with the display region, and record gesture position coordinates at current time based on a determination that detecting a case that the gesture interacts with the display region;

determine whether the gesture position coordinates at the current time are located in an interaction region of the display region, and based on a determination that the gesture position coordinates at the current time are located in the interaction region of the display region, acquire a group of the effective gaze coordinates according to the gesture position coordinates at the current time, and acquire corresponding effective gaze pupil position coordinates according to the acquired pupil position coordinates; and determine whether a quantity of effective gaze coordinates and a quantity of corresponding effective gaze pupil position coordinates reach a preset group quantity, and in a case that the quantity of the effective gaze coordinates and the quantity of the corresponding effective gaze pupil position coordinates reach the preset group quantity, calculate the gaze mapping model according to the plurality of groups of effective gaze coordinates and the corresponding plurality of groups of effective gaze pupil position coordinates; and in a case that the quantity of the effective gaze coordinates and the quantity of the corresponding effective gaze pupil position coordinates do not reach the preset group quantity, continue to detect whether the gesture interacts with the display region.

4. The gaze demarcating system of claim 3, wherein the gaze behavior determining apparatus is configured to:

according to the corresponding relationship between the pupil position coordinates and the time stamp, and the stored time stamp, acquire a plurality of pupil position coordinates in latest saved shortest effective gaze time before the current time; sort the plurality of pupil position coordinates, delete largest n values and smallest n values, and average remaining pupil position coordinates to obtain effective gaze pupil position coordinates corresponding to effective gaze coordinates at the current time, wherein the n is a positive integer greater than or equal to 1 and less than a quantity of the pupil position coordinates.

5. The gaze demarcating system of claim 3, wherein the gaze behavior determining apparatus is configured to:

acquire a plurality of gesture position coordinates in shortest effective interaction time after the current time, sort a plurality of gesture position coordinates, delete largest n values and smallest n values, and average remaining gesture position coordinates to obtain the effective gaze coordinates at the current time, wherein n is a positive integer greater than or equal to 1 and less than a quantity of the gesture position coordinates.

6. The gaze demarcating system of claim 3, wherein the gaze behavior determining apparatus is configured to:

acquire a boundary coordinates data set of the display region, and based on a determination that the gesture position coordinates are located within a range of the boundary coordinates data set of the display region, determine that the gesture interacts with the display region.

7. The gaze demarcating system of claim 3, wherein the gaze behavior determining apparatus is configured to:

acquire a boundary coordinates data set of a display interaction region, and based on a determination that the gesture position coordinates are located within a range of the boundary coordinates data set of the display interaction region, determine that the gesture position coordinates are located in the interaction region of the display region.

8. The gaze demarcating system of claim 1, wherein the gaze behavior determining apparatus is further configured to calibrate the gaze mapping model according to the first difference and the second difference.

9. The gaze demarcating system of claim 1, wherein the gaze behavior determining apparatus is configured to:

based on a determination that a plurality of gaze point coordinates within a preset time are each located near the data of the display interaction region or within a range of the data of the display interaction region, determine that the gaze point coordinates are in an effective gaze state.

10. The gaze demarcating system of claim 1, wherein the gaze behavior determining apparatus is configured to:

when a plurality of gesture pausing point coordinates within a preset time are each located near the data of the display interaction region or within a range of the data of the display interaction region, determine that the gesture pausing point coordinates are in an effective interaction state.

11. The gaze demarcating system of claim 1, wherein the eye movement tracking apparatus comprises an eye movement tracking hardware module and an eye movement tracking algorithm module, wherein the eye movement tracking hardware module comprises a first camera, a second camera, and a first processor;

the first camera is configured to collect a human face image;

the second camera is configured to collect a pupil image;

the first processor is connected with the first camera and the second camera, and is configured to acquire the human face image and the pupil image, and send the human face image and the pupil image to the eye movement tracking algorithm module;

the eye movement tracking algorithm module is electrically connected with the eye movement tracking hardware module, and is configured to locate human eye coordinates according to the human face image through a human face algorithm, and acquire the pupil position coordinates according to the pupil image by the following formula for the human eye coordinates:

$$u_B = \frac{f_{xB}(u_A - U_A)}{f_{xA}} + U_B + \frac{f_{xB} * s}{z};$$

and $$v_B = \frac{f_{yB}(v_A - V_A)}{f_{yA}} + V_B + \frac{f_{xB} * t}{z};$$

wherein $f_{xA}$, $f_{yA}$, $U_A$, $V_A$ indicates an internal parameter matrix of the first camera, $f_{xB}$, $f_{yB}$, $U_B$, $V_B$ indicates an external parameter matrix of the second camera, z indicates a distance value from current eyes to the first camera, s indicates an abscissa difference between original points of the first camera and the second camera, t indicates an ordinate difference between the original points of the first camera and the second camera, $u_B$ indicates an abscissa value of the pupil position coordinates, and $V_B$ indicates an ordinate value of the pupil position coordinates.

12. The gaze demarcating system of claim 11, wherein the gesture recognition apparatus comprises a gesture recognition hardware module and a gesture recognition algorithm module, wherein the gesture recognition hardware module comprises a third camera, a fourth camera, and a second processor;

the third camera is configured to acquire a distance from a gesture to the fourth camera;
the fourth camera is configured to collect a gesture image;
the second processor is connected with the third camera and the fourth camera, and is configured to acquire the gesture image and the distance from the gesture to the fourth camera, and send the gesture image and the distance from the gesture to the fourth camera to the gesture recognition algorithm module;
the eye movement tracking algorithm module is electrically connected with the gesture recognition hardware module, and is configured to acquire coordinates of the gesture in the fourth camera according to the gesture image, and acquire the gesture position coordinates by perform the following operation on the coordinates of the gesture in the fourth camera and the distance from the gesture to the fourth camera:

$$X = \frac{(u - u') * d}{fx};$$

$$Y = \frac{(v - v') * d}{fy};$$

fx, fy, u', v' indicates an internal parameter matrix of the fourth camera, u, v indicates the coordinates of the gesture in an image of the fourth camera, and d indicates the distance from the gesture to the fourth camera.

13. The gaze demarcating system of claim 12, wherein the eye movement tracking hardware module further comprises a first fill light, and the first processor is further configured to detect an intensity of external light rays, and turn on the first fill light when the intensity of the external light rays is less than a threshold intensity and the first camera and/or the second camera are in a collection state;

the gesture recognition hardware module further comprises a second fill light, and the second processor is further configured to detect an intensity of external light rays, and turn on the second fill light when the intensity of the external light rays is less than a threshold intensity and the third camera and/or the fourth camera are in a collection state;
a wavelength of light rays emitted by the first fill light is different from a wavelength of light rays emitted by the second fill light; and
the first camera is an RGB camera, the second camera and the fourth camera are IR cameras, and the third camera is a depth camera.

14. A gaze demarcating method, applied to the gaze demarcating system of claim 1, wherein the gaze demarcating method comprises:

acquiring, by the eye movement tracking apparatus, the pupil position coordinates, and acquiring, by the gesture recognition apparatus, the gesture position coordinates;
obtaining, in the process of the gesture interacting with the display region, by the gaze behavior determining apparatus, the plurality of groups of effective gaze coordinates and the plurality of groups of effective gaze pupil position coordinates corresponding to the plurality of groups of effective gaze coordinates according to the acquired gesture position coordinates and the acquired pupil position coordinates, wherein the plurality of groups of effective gaze coordinates correspond to different interaction positions in the display region; and
calculating, by the gaze behavior determining apparatus, according to the plurality of groups of effective gaze coordinates and the corresponding plurality of groups of effective gaze pupil position coordinates, the gaze mapping model to perform gaze demarcating.

15. The gaze demarcating method of claim 14, wherein acquiring, by the eye movement tracking apparatus, pupil position coordinates comprises: acquiring, by the eye movement tracking apparatus, a pupil image, calculating the pupil position coordinates according to the pupil image, adding a time stamp to any one of the pupil position coordinates, establishing a corresponding relationship between the pupil position coordinates and the time stamp, and storing pupil position coordinates in shortest effective gaze time of a preset multiple before a current time node and a corresponding time stamp, wherein, the shortest effective gaze time is a time experience value of gazing an interaction position before the gesture falls to the interaction position; and acquiring, by the gesture recognition apparatus, gesture position coordinates comprises: acquiring, by the gesture recognition apparatus, a gesture image, and calculating the gesture position coordinates according to the gesture image.

16. The gaze demarcating method of claim 15, wherein obtaining, by the gaze behavior determining apparatus, the plurality of groups of effective gaze coordinates and the plurality of groups of effective gaze pupil position coordinates corresponding to the plurality of groups of effective gaze coordinates according to the acquired gesture position coordinates and the acquired pupil position coordinates comprises:

detecting whether the gesture interacts with the display region, and recording the gesture position coordinates at current time in a case that detecting a state in which the gesture interacts with the display region;

determining whether the gesture position coordinates at the current time are located in an interactive region of the display region, and it is determined that the gesture position coordinates at the current time are located in the interactive region of the display region, acquiring a group of the effective gaze coordinates according to the gesture position coordinates at the current time, and acquiring corresponding effective gaze pupil position coordinates according to the acquired pupil position coordinates; and determining whether a quantity of the effective gaze coordinates and a quantity of the corresponding effective gaze pupil position coordinates reach a preset group quantity, and in a case that the quantity of the effective gaze coordinates and the quantity of the corresponding effective gaze pupil position coordinates reach the preset group quantity, calculating a gaze mapping model according to the plurality of groups of effective gaze coordinates and the corresponding plurality of groups of effective gaze pupil position coordinates; and in a case that the quantity of the effective gaze coordinates and the quantity of the corresponding effective gaze pupil position coordinates do not reach the preset group quantity, continuing to detect whether the gesture interacts with the display region.

17. The gaze demarcating method of claim 16, wherein acquiring corresponding effective gaze pupil position coordinates according to the acquired pupil position coordinates comprises:

according to the corresponding relationship between the pupil position coordinates and the time stamp, and the stored time stamp, acquiring a plurality of pupil position coordinates in latest saved shortest effective gaze time before the current time; sorting the plurality of pupil position coordinates, deleting largest n values and smallest n values, and averaging remaining pupil position coordinates to obtain effective gaze pupil position coordinates corresponding to effective gaze coordinates at the current time, wherein the n is a positive integer greater than or equal to 1 and less than a quantity of pupil position coordinates.

18. The gaze demarcating method of claim 16, wherein acquiring the group of the effective gaze coordinates according to the gesture position coordinates at the current time comprises:

acquiring a plurality of gesture position coordinates in shortest effective interaction time after the current time, sorting the plurality of gesture position coordinates, deleting largest n values and smallest n values, and averaging remaining gesture position coordinates to obtain the effective gaze coordinates at the current time, wherein n is a positive integer greater than or equal to 1 and less than a quantity of gesture position coordinates.

* * * * *